United States Patent

Karabinis et al.

[11] Patent Number: 6,134,437
[45] Date of Patent: Oct. 17, 2000

[54] DUAL-MODE SATELLITE/CELLULAR PHONE ARCHITECTURE WITH PHYSICALLY SEPARABLE MODE

[75] Inventors: Peter D. Karabinis; Nils Rutger Carl Rydbeck; Michael Kornby, all of Cary, N.C.

[73] Assignee: Ericsson Inc., Research Triangle Park, N.C.

[21] Appl. No.: 08/874,328

[22] Filed: Jun. 13, 1997

[51] Int. Cl.[7] .................................................. H04Q 7/20
[52] U.S. Cl. .......................... 455/427; 455/12.1; 455/552
[58] Field of Search ................................. 455/11.1, 12.1, 455/427, 552, 558, 13.1, 456, 461, 553; 375/202

[56] References Cited

U.S. PATENT DOCUMENTS

| | | | |
|---|---|---|---|
| 4,672,655 | 6/1987 | Koch | 455/427 |
| 5,351,270 | 9/1994 | Graham et al. | 455/11.1 |
| 5,422,934 | 6/1995 | Massa | 455/11.1 |
| 5,490,284 | 2/1996 | Itoh et al. | 455/11.1 |
| 5,535,430 | 7/1996 | Aoki et al. | 455/552 |
| 5,535,432 | 7/1996 | Dent | 455/12.1 |
| 5,586,165 | 12/1996 | Wiedeman | 455/427 |
| 5,628,049 | 5/1997 | Suemitsu | 455/427 |
| 5,673,308 | 9/1997 | Akhavan | 455/461 |
| 5,767,788 | 6/1998 | Ness | 455/456 |
| 5,884,168 | 8/1996 | Kolev et al. | 455/558 |

FOREIGN PATENT DOCUMENTS

| | | |
|---|---|---|
| 0 280 543 A2 | 8/1988 | European Pat. Off. . |
| 2 241 850 | 9/1991 | United Kingdom . |
| WO 90/08447 | 7/1990 | WIPO . |
| 94/05101 | 3/1994 | WIPO .............................. H04B 17/00 |
| WO 96/34503 | 10/1996 | WIPO . |

Primary Examiner—Nay Maung
Assistant Examiner—Quochien B. Vuong
Attorney, Agent, or Firm—Burns, Doane, Swecker & Mathis, L.L.P.

[57] ABSTRACT

In a dual-mode satellite/cellular phone system, a user has the option of placing or receiving calls to and from the satellite network with either the cellular/PCS phone or the fully self-contained, stand-alone satellite phone. If the user places or receives a satellite call with the cellular/PCS phone, the communication signals to and from the cellular/PCS phone will first be received from or transmitted to the satellite phone over a short-range, low-power communication link. The satellite phone, in turn, communicates directly with the satellite network from a location that is within a short range of the cellular/PCS phone, and from a location that preferably has a direct line-of-sight with the one or more satellites that make up the satellite network.

20 Claims, 2 Drawing Sheets

DUAL-MODE SATELLITE/CELLULAR PHONE ARCHITECTURE WITH PHYSICALLY SEPARABLE MODE

BACKGROUND

The present invention relates to a wireless telecommunications system. More particularly, the present invention relates to a wireless communication system that is capable of communicating over a local cellular/PCS air interface or, alternatively, a satellite air interface.

Dual-mode satellite/cellular phones are well-known in the art, and they are capable of operating in either a cellular/PCS mode or in a satellite mode. However, such phones are relatively large and heavy compared with ordinary cellular phones. This is especially true, now that cellular technology is producing cellular telephone handsets with a size and weight approximating that of a credit card.

The reason why satellite telephones and dual-mode cellular/satellite phones are relatively large and heavy compared to standard cellular telephones is that the components required to communicate over the satellite air interface are, in general, much larger than those required to operate over the cellular/PCS air interface. For example, the directional antenna in a satellite telephone is large so that it provides the directional gain needed to help overcome the poor link margin that is characteristic of satellite signal transmissions. In addition, satellite telephones and/or dual-mode cellular/satellite phones contain relatively large power amplifiers and batteries, which are also needed to help overcome the relatively poor link margin. The added size and weight due to these components make satellite phones and/or dual-mode phones bulky and cumbersome to carry.

Previous attempts have been made to reduce the size and weight of dual-mode satellite/cellular phones. Some of these efforts have focused on developing fully integrated baseband chip sets that incorporate the functionality of both terrestrial (i.e., land-based cellular) and satellite modes. However, such designs are still relatively bulky and heavy, as many of the above-identified components required to communicate over the satellite air interface are still required outside the baseband portion of the unit.

In U.S. patent application Ser. No. 08/756,709, "Satellite Communications Adapter for a Cellular Handset," some or all of the heavy, power intensive satellite-mode components, such as the directional antenna, the battery and the power amplifier, are maintained in a satellite signal relay device, which is physically separate from the dual-mode satellite/cellular telephone handset (i.e., the man-machine interface). Therefore, the handset itself remains somewhat small and light weight. In the satellite-mode, the dual-mode satellite/cellular handset transmits and receives signals to and from the satellite network through the satellite signal relay device. More specifically, upon receiving signals from the satellite network, the satellite signal relay device downconverts the RF transmission into a low power cellular signal and then re-transmits the signal to the less bulky, lightweight handset over a local cellular frequency. Similarly, upon receiving a satellite communications signal from the handset, the satellite signal relay device upconverts the signal and then re-transmits it to the orbiting satellite network.

There will be situations, however, when it is advantageous to communicate via satellite directly, without first having to transmit and receive over an additional cellular link. As the link margins associated with satellite signals are already inherently low, as mentioned above, a user, under certain conditions, may have difficulty achieving a good quality link if, in addition to the already low link margin associated with the satellite link, the interference levels and distortional effects present in the local cellular environment further degrade the communication signal. Under such conditions, the user may wish to have the option to place or receive a satellite call directly, and to avoid further signal degradation caused by a local cellular/PCS link.

Another consideration is that satellite subscribers expect to have global or near global coverage. Yet dual-mode satellite/cellular systems in which the satellite-mode relies on a cellular/PCS link run the risk of being operationally limited to regions which provide compatible cellular services. For example, a dual-mode, satellite/cellular phone that is compatible with the GSM standard used in Europe could not be used in either a satellite or a cellular mode in the United States, since the United States employs the AMPS standard, as those skilled in the art will recognize. Even if the above limitation could be solved, a local cellular/PCS operator (or regulatory body) may object to having the cellular/PCS frequencies reused for relaying information to the satellite signal relay device, since this may cause, under certain conditions, interference to the local cellular/PCS network.

Clearly, a need exists for a satellite/cellular phone system that allows a user to place either cellular calls or satellite calls through a lightweight satellite/cellular handset. Alternatively, a user must maintain the ability to place satellite calls through a stand-alone (i.e., self-contained) unit, wherein the communication signals are not subject to any incompatibility with local cellular services, nor subject to interference and/or distortion that may be present in the local cellular environment. Furthermore, there is a need to better ensure that the satellite subscriber has truly global or near global capability.

SUMMARY

Accordingly, it is an objective of the present invention to provide a dual-mode, satellite/cellular (PCS) phone system that allows the user to place ordinary cellular or satellite calls through a lightweight handset.

It is another objective of the present invention to provide a dual-mode, satellite/cellular (PCS) phone system that allows the user to place a satellite call through a stand-alone, fully self-contained satellite telephone unit if desired.

It is yet another objective of the present invention to provide a dual-mode, satellite/cellular (PCS) phone system that helps ensure global or near global service regardless whether the cellular mode is compatible with the local cellular system.

In accordance with one aspect of the present invention, the foregoing and other objects are achieved by a system that comprises a cellular telephone handset and a secondary telephone. Both the cellular telephone handset and the secondary telephone include a short-range, low-power transceiver. The system also includes a short-range, low-power telecommunications link which directly couples the cellular telephone handset and the secondary telephone.

In accordance with another aspect of the present invention, the foregoing and other objects are achieved by a system that comprises a cellular telephone handset and a stand-alone satellite telephone. Both the cellular telephone handset and the satellite telephone include a short-range, low-power transceiver. The system further comprises a short-range, low-power telecommunications link coupling the cellular telephone handset and the stand-alone satellite telephone.

In accordance with yet another aspect of the present invention, the foregoing and other objects are achieved by an apparatus that comprises a cellular telephone handset and a stand-alone satellite telephone. The apparatus also includes means for establishing a short-range, low-power telecommunications link between the cellular telephone handset and the stand-alone satellite telephone.

BRIEF DESCRIPTION OF THE DRAWINGS

The objects and advantages of the invention will be understood by reading the following detailed description in conjunction with the drawings in which.

DETAILED DESCRIPTION

Figure 1:
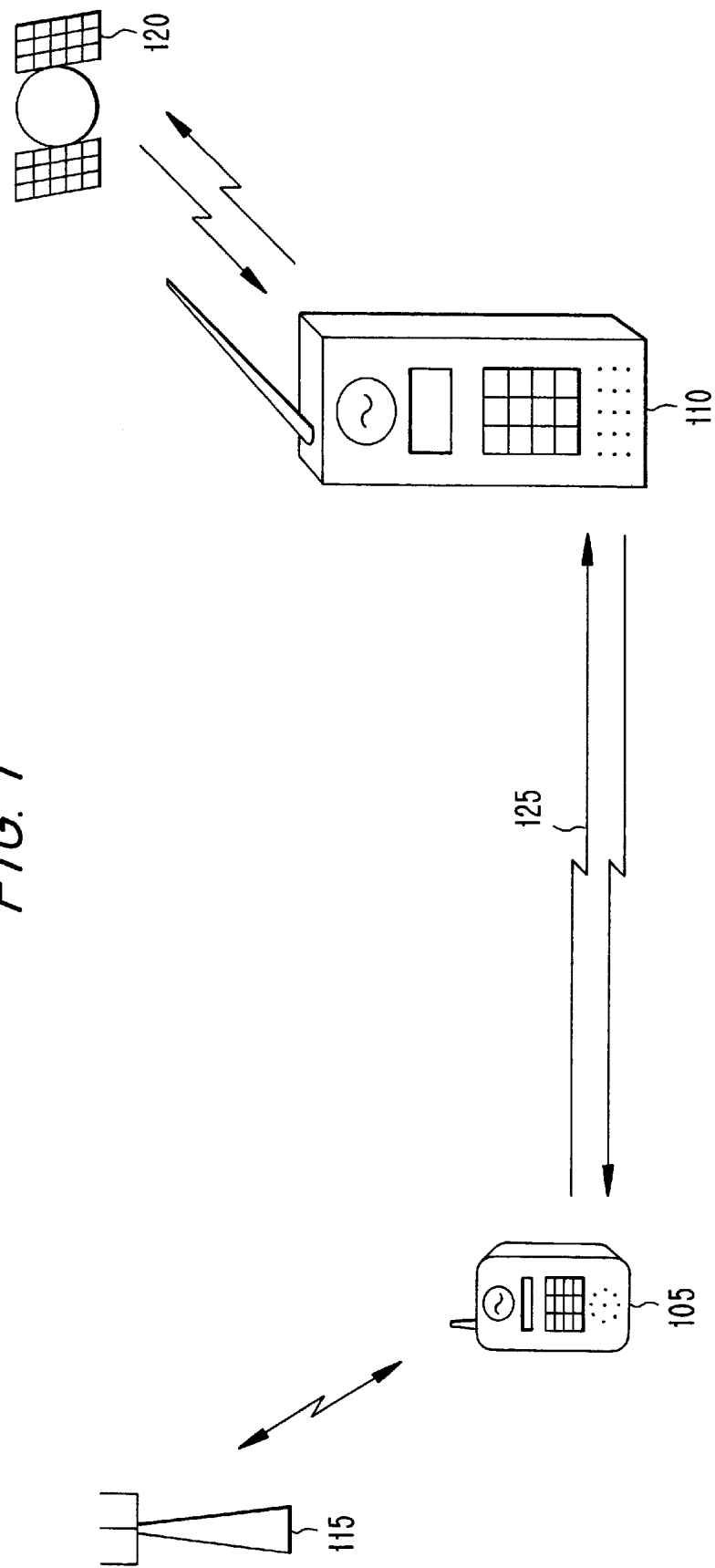
FIG. 1 is a diagram of the dual-mode satellite/cellular phone system.

The various features of the invention will now be described with respect to the figures, in which like parts are identified with the same reference characters.

FIG. 1 illustrates the concept embodied by the present invention, wherein a fully operational cellular/PCS phone 105 and a fully operational, self-contained, stand-alone satellite phone 110 are kept physically separated from each other. Both the cellular/PCS phone 105 and the stand-alone satellite phone 110 are capable of being operated independent of the other. For example, the cellular/PCS phone can be used to place or receive cellular calls through a local cellular service, as represented by the cellular base station tower 115. Similarly, the satellite phone 110 can be used to place or receive satellite calls with a satellite telecommunications network, represented by satellite 120.

FIG. 1 also illustrates that a short-range, low power communication link 125 is maintained between the cellular/PCS phone 105 and the satellite phone 110. When the satellite phone 110 receives an incoming call (i.e., when the satellite phone rings), the cellular/PCS phone 105 will also receive the call, through the satellite phone 110, which essentially re-transmits the call from the satellite 120 to the cellular/PCS phone 105 over the short-range, low-power communication link 125. Thus, a user can choose to answer the incoming satellite call with the cellular/PCS phone 105, or choose to answer the incoming satellite call with the satellite phone 110, as it is a fully self-contained, stand-alone unit.

In order to maintain the best possible signal quality, it is preferable to situate the satellite phone 110 at or near a location having a direct line-of-sight to the orbiting satellite 120. For example, if the present invention is being used indoors, the satellite phone 110 may be placed at or near a window. If, on the other hand, the present invention is being used outdoors, the satellite phone 110 may be clipped or somehow attached to a stationary or semi-stationary object, such as the user's belt, so the user can avoid carrying the somewhat bulky satellite phone 110.

During an incoming satellite call, the user, as stated above, has the option of answering the incoming call with the cellular/PCS phone 105. Of course, this is true assuming the cellular/PCS phone 105 is within the range of the satellite phone 110, as defined by the characteristics of the short-range, low-power communication link 125. The user may find it desirable to use the cellular/PCS phone 105 to answer the incoming satellite call for at least two reasons. First, the cellular/PCS phone 105 is more mobile than the satellite phone 110, in that the cellular/PCS phone 105 is relatively small and lightweight. Second, the cellular/PCS phone 105 should be more comfortable to use in proximity to one's face, as it is far less likely to generate a significant amount of heat. In fact, the cellular/PCS phone 105 radiates milliwatts of power, while the satellite phone 110 radiates on the order of several watts of peak RF energy. Despite these reasons, the user may still want to answer an incoming satellite call with the satellite phone 110, rather than the cellular PCS phone 105, and the present invention permits the user to do this as the satellite phone 110 is, as stated above, a fully self-contained, stand-alone unit.

When placing outgoing satellite calls, the user, once again, has the option of using the cellular/PCS phone 105 or the stand-alone satellite phone 110. In this instance, the cellular/PCS phone 105 will transmit the communication signal to the satellite phone 110 over the short-range, low-power communication link 125. The satellite phone 110 will then re-transmit the signal to the orbiting satellite 120 over a long-range, high power RF link.

Whether the cellular phone 105 is used to place an outgoing satellite call, or whether it is used to receive an incoming satellite call, the stand-alone satellite phone 110, in either case, essentially serves as a radio signal repeater, receiving and re-transmitting signals between the orbiting satellite 120 and the cellular/PCS phone 105, wherein the satellite phone 110 communicates with the cellular/PCS phone 105 over the above-identified, short-range, low-power communication link 125.

Figure 2:
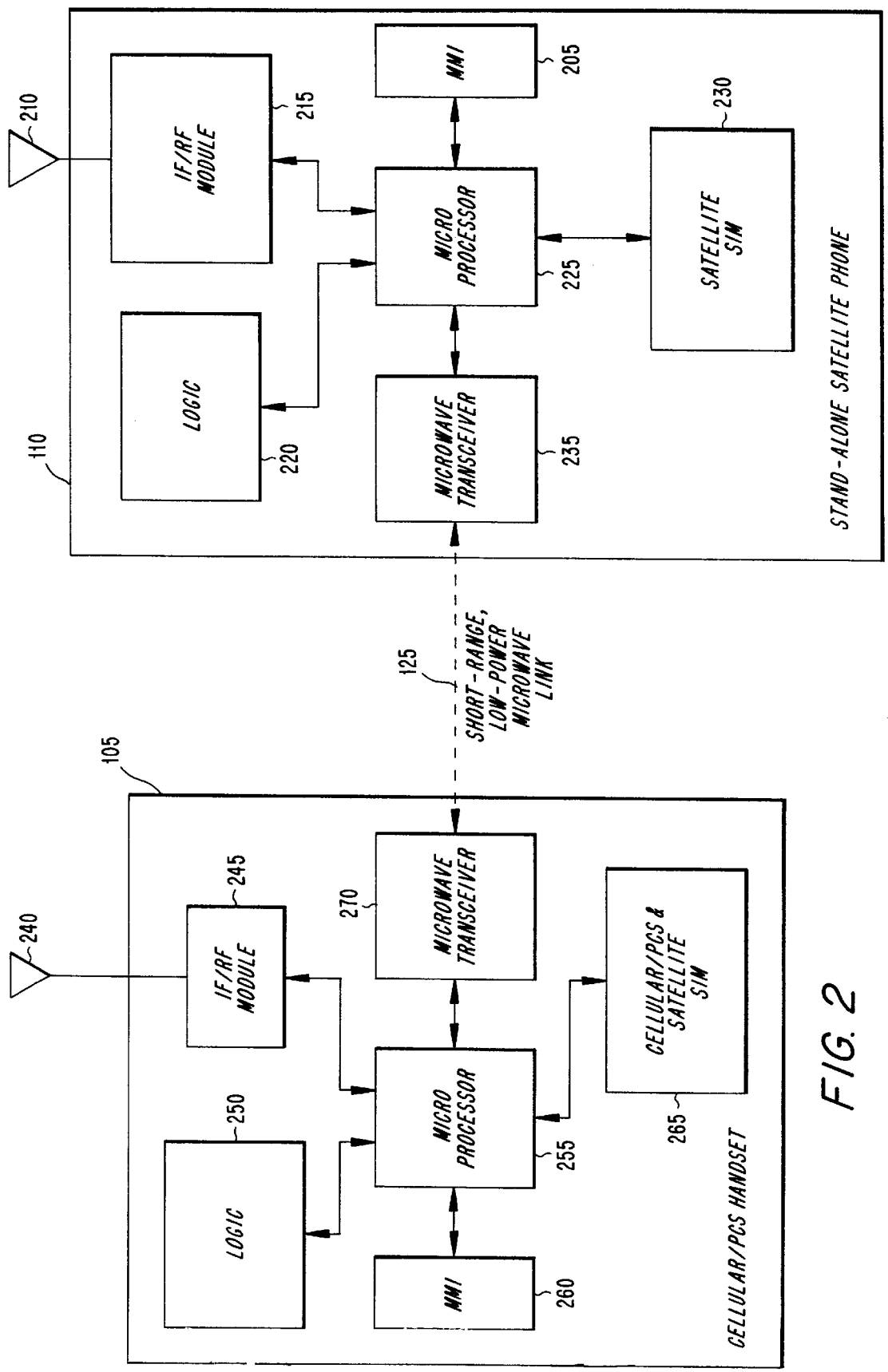
FIG. 2 is a diagram of the internal architecture of the satellite and cellular/PCS phones in accordance with the present invention.

FIG. 2 shows, in more detail, the internal architecture of the cellular/PCS phone 105 and the self-contained, stand-alone satellite phone 110, in accordance with a preferred embodiment of the present invention. As illustrated, the satellite phone 110 includes, among other things, an MMI 205. The MMI 205 allows the user to directly communicate over the satellite network without having to use the cellular/PCS phone 105. The satellite phone 110 also includes a relatively large directional antenna 210; an IF/RF module 215 that contains a transceiver (not shown) for transmitting and receiving satellite signals to and from the orbiting satellite 120; a logic unit 220 that provides signal processing capabilities; a microprocessor 225; and a SIM card 230 that contains a unique telephone identification code which permits the satellite phone 110 to recognize, receive and decode only appropriate incoming satellite calls. Most notably, however, the satellite phone 110 includes a transceiver unit 235. The transceiver unit 235 is used for transmitting and receiving signals to and from the cellular/PCS phone 105 over the short-range, low-power communication link 125, when the cellular/PCS phone 105 is being used to place or receive satellite calls.

FIG. 2 also illustrates that the cellular/PCS phone 105 contains an antenna 240; an IF/RF module 245, which includes a transceiver (not shown) for transmitting and receiving cellular/PCS calls to and from the local cellular system; a logic unit 250; a microprocessor 255; an MMI 260; and a SIM card 265. In contrast, the antenna 240 in the cellular/PCS phone 105 is not as large as the directional antenna 210 in the satellite phone 110. Likewise, the IF/RF module 245 is not as large as the IF/RF module 215, because the IF/RF module 245 does not contain the high power amplifiers that the satellite phone 110 requires to overcome the low link margin described above. Also in contrast to the satellite phone 110, the SIM card 265, installed in the cellular/PCS phone 105, contains two unique subscriber identification codes. The first permits the cellular/PCS phone 105 to recognize, receive and decode incoming cellular/PCS calls, while the second is the same as the subscriber identification code on SIM card 230, thus permitting the cellular/PCS phone 105 to also recognize, receive and decode incoming satellite network calls through satellite phone 110. And in addition, the cellular/PCS phone 105 includes a transceiver 270. The transceiver 270 allows the cellular/PCS phone 105 to communicate with the satellite phone 110 over the aforementioned short-range, low-power communication link 125.

In an alternative embodiment, the cellular/PCS phone 105 may include a SIM card 265 that contains only one unique subscriber identification code. The one subscriber identification code will permit the cellular/PCS phone 105 to recognize, receive and decode incoming calls, whether the incoming calls are through the cellular/PCS network or the satellite network.

To implement this single subscriber code alternative, the user pre-selects either the cellular/PCS network as the preferred network, or the satellite network as the preferred network. When the cellular/PCS phone 105 is first turned on, the unit determines whether the preferred network is available. If the preferred network is available, the subscriber code is registered with the preferred network. If the preferred network is not available, the unit determines if the secondary network is available. If it is available, then the subscriber code is registered with the secondary network. The cellular/PCS phone 105 can then receive incoming calls on either network with the same subscriber code.

In yet another alternative embodiment, the stand-alone satellite phone 110 or the cellular/PCS handset 105, or both, do not contain a SIM card. In this case, the subscriber identification code(s) may be stored in the memory of the corresponding unit.

With respect to the short-range, low-power communication link 125, this provides a mechanism over which the cellular/PCS phone 105 and the satellite phone 110 can communicate with one another. During incoming satellite network calls, the satellite phone 110 will initially receive the RF transmission from the orbiting satellite 120, down-convert the signal to baseband, then remodulate and transmit the signal to the cellular handset over the communication link 125. Similarly, during an outgoing call, the cellular/PCS phone 105 will transmit the communication signal over the communication link 125 to the satellite phone 110, which, in turn, will encode and re-transmit the signal to the orbiting satellite 120.

In a preferred embodiment of the present invention, the communication link 125 will be a radio frequency (RF) link and operate in the ISM frequency band at approximately 2.5 GHz, although one skilled in the art will readily understand that other frequencies could be used. Additionally, the microwave signals will be transmitted at a relatively low power level, on the order of less than 1 watt. Accordingly, the microwave link will not be operating in the cellular/PCS frequency bands, nor subject to any of the interference, distortion, or regulations associated with those frequency bands. Furthermore, operating the microwave link in the ISM band allows the present invention to be deployed globally, without the restriction of local government regulation, as the ISM band is unregulated.

Also in a preferred embodiment of the present invention, the microwave signals will be transmitted between the cellular/PCS phone 105 and the satellite phone 110 using a frequency hopping scheme to ensure a high quality communication link. However, one skilled in the art will recognize that other spread-spectrum selection schemes are possible, and that such options are well-known in the art. Advantageously, the frequency hopping sequence associated with a particular one satellite phone 110 and its companion cellular/PCS handset 105, is uniquely derived from the satellite SIM code residing in the pair, thus providing different and unique frequency hopping sequences to each satellite phone 110 and cellular/PCS handset 105 user pair. This feature minimizes interference between a possible plurality of such user pairs when operating in close proximity to each other.

Although the foregoing discussion focuses on a dual-mode satellite/cellular phone architecture, the concept of the present invention can be expanded to include an alternative embodiment in which the dual-mode, cellular/PCS handset 105 is used in conjunction with one or more secondary cellular phones, wherein each of the one or more secondary cellular phones has its own subscriber identification code. The advantage of this alternative embodiment is that a user subscribing to several cellular services is saved from having to physically carry multiple cellular handsets. Similarly, the dual-mode cellular/PCS handset 105 may be used in conjunction with any high power communication device, for example, a car phone. Of course, the cellular/PCS handset 105 would still communicate with the one or more secondary cellular phones or the high power communication device over a short-range, low-power link as previously described.

The present invention has been described with reference to a preferred embodiment. However, it will be readily apparent to those skilled in the art that it is possible to embody the invention in specific forms other than the preferred embodiment described above, and that this may be done without departing from the spirit of the invention. The preferred embodiment is illustrative and should not be considered restrictive in any way. The scope of the invention is given by the appended claims, rather than the preceding description, and all variations and equivalents which fall within the range of the claims are intended to be embraced therein.

What is claimed is:

1. A cellular/satellite communication system comprising:
   a cellular telephone handset which communicates with a base station on a first frequency band and includes a short-range, low-power transceiver;
   a stand-alone satellite telephone including a short-range, low-power transceiver; and
   a short-range, low-power telecommunications link coupling said cellular telephone handset and said stand-alone satellite telephone, wherein said short-range, low-power telecommunications link operates in a second frequency band.

2. The system of claim 1, wherein said short-range, low-power telecommunications link is a low-power microwave link.

3. The system of claim 2, wherein said low-power microwave link operates in the ISM band.

4. The system of claim 1, wherein said cellular handset comprises:
   an IF/RF module for communicating on said first frequency band with said base station, wherein said base station is part of a compatible local cellular/PCS service; and
   a SIM card containing identification information that permits said cellular handset to receive both cellular calls through the local cellular/PCS service and satellite calls through the stand-alone satellite telephone and the short-range, low-power telecommunications link.

5. The system of claim 4, wherein the identification information is a single subscriber identification code.

6. The system of claim 4, wherein the identification information comprises:

a first subscriber identification code for receiving calls through the local cellular/PCS service; and a second subscriber identification code for receiving calls through the stand-alone satellite telephone.

7. The system of claim 1, wherein said stand-alone satellite telephone comprises:

an IF/RF module for communicating with an orbiting satellite; and a SIM card containing identification information that permits said satellite telephone to receive satellite communications directly from an orbiting satellite.

8. The system of claim 1, wherein said short-range, low-power telecommunications link operates in a frequency hopping mode within said second frequency band.

9. The system of claim 8 further comprising:

a first SIM card contained within said cellular telephone handset; and a second SIM card contained within said stand-alone satellite telephone, wherein said first and said second SIM cards define a frequency hopping sequence.

10. The system of claim 1, wherein said cellular telephone handset and said stand-alone satellite telephone comprise:

means for receiving incoming signals;

means for downconverting said incoming signals to baseband;

means for remodulating said baseband signals; and means for transmitting said remodulated signals over said short-range, low-power telecommunications link.

11. A cellular/satellite telecommunications apparatus comprising:

a cellular telephone handset which communicates with a base station on a first frequency band;

a stand-alone satellite telephone; and means for establishing a short-range, low-power telecommunications link between said cellular telephone handset and said stand-alone satellite telephone, wherein said short-range, low-power telecommunications link operates within a second frequency band.

12. An apparatus in accordance with claim 11, wherein said means for establishing a short-range, low-power telecommunications link comprises:

transceiver means, in said stand-alone satellite telephone, for transmitting and receiving low-power signals to and from said cellular telephone handset; and transceiver means, in said cellular telephone handset, for transmitting and receiving low-power signals to and from said stand-alone satellite telephone.

13. An apparatus in accordance with claim 11, wherein the short-range, low-power telecommunications link is a microwave link.

14. An apparatus in accordance with claim 13, wherein the second frequency band is in the ISM frequency band.

15. An apparatus in accordance with claim 11, wherein said stand-alone satellite telephone comprises:

telephone identification module means for allowing said stand-alone satellite telephone to receive satellite communications.

16. An apparatus in accordance with claim 11, wherein said cellular telephone handset comprises:

telephone identification module means for allowing said cellular telephone handset to receive either satellite network calls or cellular network calls.

17. An apparatus in accordance with claim 16, wherein said telephone identification module means comprises:

a single subscriber identification code means for permitting said cellular telephone handset to receive satellite network calls and cellular network calls.

18. An apparatus in accordance with claim 16, wherein said telephone identification module means comprises:

a first subscriber identification means for permitting said cellular telephone handset to receive satellite network calls; and a second subscriber identification means for permitting said cellular telephone handset to receive cellular network calls.

19. An apparatus in accordance with claim 11, wherein said means for establishing a short-range, low-power telecommunications link comprises:

frequency hopping means for generating a sequence of frequencies, within said second frequency band, over which the short-range, low-power telecommunications link operates.

20. An apparatus in accordance with claim 11, wherein said cellular telephone handset and said stand-alone satellite telephone comprise:

means for receiving an incoming signals;

means for downconverting said incoming signals to baseband;

means for remodulating said baseband signals; and means for transmitting said remodulated signals over said short-range, low-power telecommunications link.

* * * * *